United States Patent [19]

Nakamura

[11] 4,175,273
[45] Nov. 20, 1979

[54] APPARATUS FOR AUTOMATICALLY STOPPING A CASSETTE TAPE RECORDER

[75] Inventor: Toshiaki Nakamura, Hachioji, Japan

[73] Assignee: Olympus Optical Co., Ltd., Tokyo, Japan

[21] Appl. No.: 916,796

[22] Filed: Jun. 19, 1978

[30] Foreign Application Priority Data

Jul. 5, 1977 [JP] Japan .................... 52/88822[U]

[51] Int. Cl.² ............... G11B 15/22; B65H 59/38; B65H 63/02
[52] U.S. Cl. .................... 360/74.3; 360/137; 242/190
[58] Field of Search ............ 360/74, 137; 242/189, 242/190; 226/11, 178

[56] References Cited
U.S. PATENT DOCUMENTS

| | | | |
|---|---|---|---|
| 3,971,528 | 7/1976 | Komatsu et al. | 360/74 |
| 3,973,743 | 8/1976 | Suzuki | 360/74 |
| 4,033,491 | 7/1977 | Aldenhoven | 360/137 |

Primary Examiner—Robert S. Tupper
Attorney, Agent, or Firm—Lerner, David, Littenberg & Samuel

[57] ABSTRACT

An apparatus for automatically stopping a cassette tape recorder comprises a tape end detecting lever adapted to rotate through a given angle at the end of a running tape, a switch which responds to the rotation of the detecting lever by closing to energize a motor for rotation at a high speed, a release lever pivotally mounted on the detecting lever, a pusher pin fixedly mounted on a flywheel for angularly driving the release lever, and release means responsive to the angular movement of the release lever to reset a recorder. The motor is driven at a high speed as the tape end is reached, thereby supplying sufficient moment to the flywheel.

11 Claims, 4 Drawing Figures

4,175,273

APPARATUS FOR AUTOMATICALLY STOPPING A CASSETTE TAPE RECORDER

BACKGROUND OF THE INVENTION

The invention relates to an apparatus for automatically stopping a cassette tape recorder, and more particularly to such apparatus which automatically stops a recorder when the end of a running tape is reached.

Apparatus is known which activates an automatic stopping mechanism of a tape recorder by utilizing the inertial energy of a flywheel which is used to provide a stable drive to a capstan. The apparatus does not occupy a substantial amount of space within the recorder, and hence is extensively employed in portable cassette tape recorders of a small size. The apparatus includes a tape end detecting lever having its one end mounted on a tape supply shaft and its other end mounted on a release lever and which is driven through a given angle under the tape tension as the end of a running tape is reached, thereby allowing the displaced release lever to be angularly driven by a pusher pin which is fixedly mounted on a flywheel. The angular movement of the release lever is effective to unlock an operating member of the recorder, thus providing means for automatically stopping the recorder.

The described apparatus operates satisfactorily with conventional arrangements, but does not operate in a reliable manner when it is applied to a tape recorder of the type which utilizes two levels of the tape speed. The difficulty becomes manifest when the tape speed is reduced to a lower speed which is one-half the standard speed. Specifically, when the tape speed is reduced, the inertial energy of the flywheel reduces, and hence the force available for the pusher pin to drive the release lever is insufficient.

SUMMARY OF THE INVENTION

It is an object of the invention to provide an apparatus for automatically stopping a cassette tape recorder which eliminates the described disadvantage by providing a switch which is closed as a tape end detecting lever rotates to thereby energize a motor for rotation at a high speed so that sufficient inertial energy is imparted to the flywheel even during the tape running at a low speed, thus providing an automatic stop mechanism which operates in a reliable manner.

In accordance with the invention, there is provided an apparatus for automatically stopping a tape recorder of the type having a variable tape speed. When the motor is rotating at low speed to feed the tape at low rate the inertial energy of the flywheel is reduced, the energy of inertia of the flywheel is momentarily increased as the tape end is reached, thus assuring a reliable operation of the apparatus. The invention provides an optimum arrangement where the space requirement imposes a limitation on the size of the flywheel and the use of a high power motor is inhibited, as in a cassette tape recorder of a miniature size.

DESCRIPTION OF PREFERRED EMBODIMENT

Figure 1:
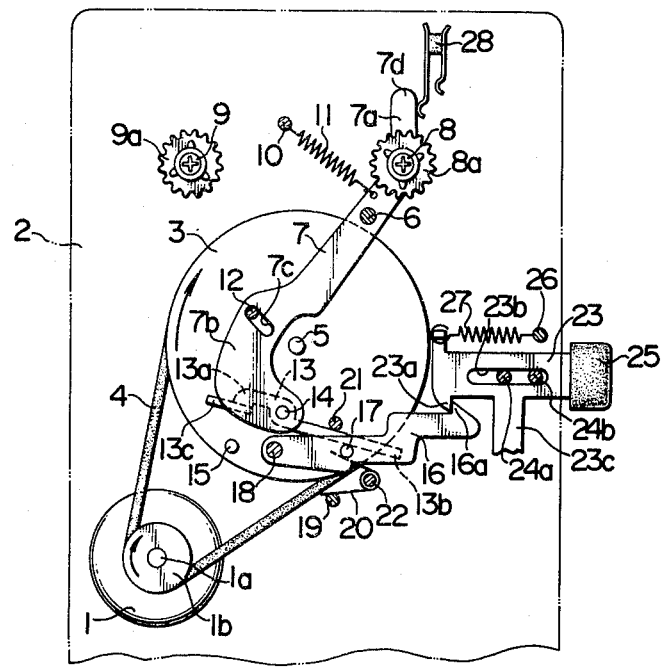
FIG. 1 is a plan view of an apparatus for automatically stopping a cassette tape recorder according to one embodiment of the invention.

Referring to FIG. 1, there is shown a drive motor 1 which is mounted on the underside of a stationary baseplate 2 of a tape recorder by suitable means. The motor has an output shaft 1a on which an output pulley 1b is fixedly mounted. An endless closed loop belt 4 extends around the pulley 1b and a flywheel 3 to transmit the rotation of the motor 1 to the latter. In the example shown, the motor 1 is assumed to rotate clockwise, and hence the flywheel 3 also rotates clockwise. As is well known, the flywheel is fixedly mounted on a capstan 5, which cooperates with a pinch roller, not shown, to feed a tape in a stable manner. The flywheel is also rotatably mounted on the underside of the baseplate 2, while the capstan 5 extends through the baseplate to the upper side thereof and is located opposite to the pinch roller.

Also disposed on the underside of the baseplate 2 is a tape end detecting lever 7 which is pivotally mounted on a pin 6, which is secured to the underside of the baseplate 2. One arm 7a of the lever 7 extends outwardly of the baseplate 2 along the underside thereof while the other arm 7b extends between the underside of the baseplate and the upper surface of the flywheel 3 for angular movement therebetween. A tape supply shaft 8 extending above the baseplate 2 is rotatably mounted on the arm 7a, and is engaged by a tape supply hub, not shown, of a tape cassette. A tape take-up shaft 9 is rotatably mounted on the upper side of the baseplate 2, and is located relative to the shaft 8 so as to be engaged by a tape take-up hub, not shown, of a tape cassette. Both shafts 9, 8 are provided with coaxial drive gears 9a, 8a, respectively, which are adapted to be driven for rotation by suitable means.

The lever 7 is biased to rotate counter-clockwise about the pin 6 by a coiled tension spring 11 which extends between the arm 7a and a stationary pin 10 secured to the underside of the baseplate 2. However, the resulting rotation is normally blocked by the abutment against a stop pin 12 of the left-hand edge of an elongated slot 7c formed in the arm 7b for the purpose of limiting the extent of angular movement. Fixedly mounted on the underside of the free end of the arm 7b is a pin 14 which rotatably carries a release lever 13, which is disposed in partly overlapping relationship with the arm 7b. The release 13 has an arm 13a which extends to the left, as viewed in FIG. 1, with an abutment 13c in the form of a folded upright piece provided on the free end thereof. The abutment 13c is adapted to move into the path of rotation of a pusher pin 15 fixedly mounted on the flywheel 3 adjacent to the periphery thereof, as the lever 7 is rotated clockwise about the pin 6 under the tape tension when the end of a running tape is reached, and thus is driven by the pin 15 to cause an angular movement of the release lever 13 clockwise about the pin 14.

The release lever 13 has another arm 13b which extends in the opposite direction from the arm 13a and is maintained in abutment against a depending pin 17 from a constraining member 16. The constraining member 16 is rockably mounted on a pin 18 which is fixedly mounted on the underside of the baseplate 2, and fixedly carries the pin 17 intermediate its length, with a hook 16a formed on its free end. A torsion spring 20 is disposed on a pin 22 secured to the underside of the baseplate 2 and has its one end abutting against the pin 17 and its other end abutting against a stationary pin 19, thus biasing the constraining member to rotate counter-clockwise about the pin 18. As a consequence, the pin 17 is maintained in abutment against the arm 13b. The arm 13b is urged by the pin 17 to move counter-clockwise, but such angular movement is blocked by the abutment of the arm 13b against a stop pin 21 secured to the underside of the baseplate 2. In this manner, the arm 13b is held sandwiched between the pins 21, 17.

A record/playback operating member 23 is disposed to the right, as viewed in FIG. 1, of the flywheel 3 and is adapted to be maintained in its operative position by the constraining member 16. The operating member 23 includes a horizontal portion in which an elongated guide slot 23b is formed and engaged by a pair of stationary pins 24a, 24b secured to the underside of the baseplate 2, thus allowing the member 23 to move in the horizontal direction, as viewed in FIG. 1, relative to the baseplate 2. The right-hand end of the operating member extends out of the casing of a tape recorder and is provided with a button 25 thereon. When the button 25 is depressed or moved in a direction toward the flywheel, a lateral arm 23c extending from the operating member 23 from the lower edge thereof operates to move a record/playback head into abutment against a running tape located within a tape cassette, thus achieving a record/playback operation.

A coiled return spring 27 has its one end achored to the upper edge of the operating member 23 and its other end connected with a stationary pin 26 on the baseplate 2, thus allowing the operating member 23 to return to its inoperative position under the resilience of this spring whenever the operating member 23 is unlocked. The operating member 23 is maintained in its operative position by the engagement between a hook 23a formed on the lower edge thereof adjacent to the free end and the hook 16a of the constraining member 16.

Figure 2:
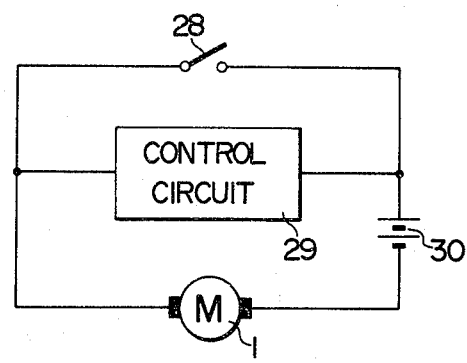
FIG. 2 is a circuit diagram of a motor drive circuit.

A switch 28 is disposed adjacent to the free end 7d of the arm 7a of the detecting lever 7, and is formed as a normally-open switch. When the lever 7 rotates clockwise about the pin 6, the switch is closed by the free end 7d (see FIGS. 3 and 4). The switch 28 is connected with the motor in a manner shown in FIG. 2. Specifically, a motor drive circuit includes a control circuit 29 of a known form which operates to maintain a constant motor speed, and the circuit 29 is connected in series with the motor 1 across a d.c. source 30. The switch 28 is connected in shunt with the control circuit 29.

Figure 3:
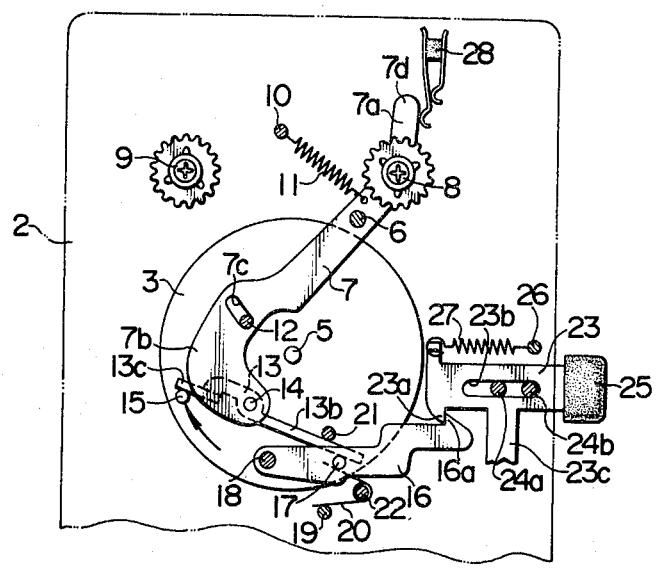
FIGS. 3 and 4 are plan views, illustrating the operative conditions of the apparatus shown in FIG. 1.
Figure 4:
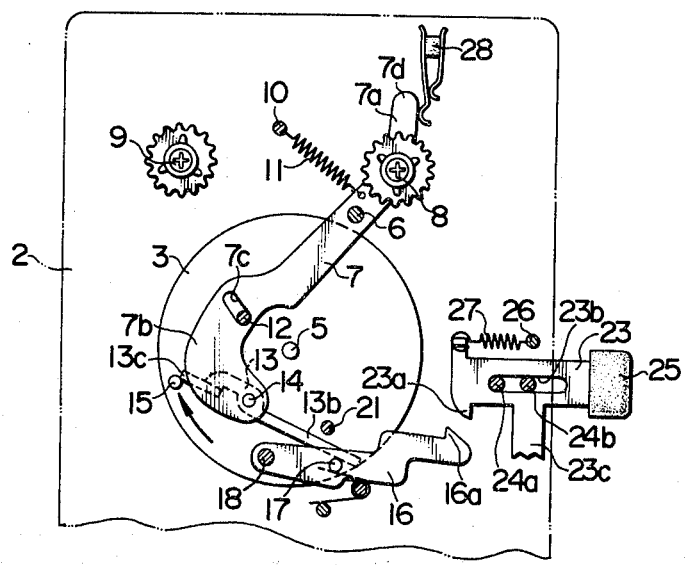

In operation, when the button 25 is depressed as shown in FIG. 1 to establish a record/playback mode, the magnetic head, not shown, is maintained in abutment against the running tape to perform a recored or playback operation whichever is desired. Such mode is maintained by the engagement between the hooks 23a, 16a when the operating member 23 is moved to the left against the resilience of the spring 27. The movement of the operating member 23 is also effective to close a main switch, not shown, whereby the motor 1 is driven for rotation at uniform rate under the control of the control circuit 29, acting through the flywheel 3 to rotate the capstan 5 at a uniform speed. The capstan cooperates with a pinch roller, not shown, to feed the tape at uniform rate. When the end of a running tape is reached, the tape supply hub is pulled in the tape feed direction by the tape tension since the tape end is anchored to the tape hub. Consequently, the shaft 8 is moved in the same direction, causing a clockwise rotation of the detecting lever 7 about the pin 6 against the resilience of the spring 11, as shown in FIG. 3. Since the release lever 13 is mounted on the arm 7b of the lever 7, the abutment 13c is moved into the path of rotation of the pusher pin 15 on the flywheel 3. In addition, when the lever 7 rotates clockwise, the end 7d of its arm 7a closes the switch 28, short-circuiting the control circuit 29 to connect the drive motor 1 directly across the source 30. Thus, the motor rotates at an increased speed as does the flywheel 3, thus increasing the inertial energy of the flywheel.

Under this condition, the pusher pin 15 drives the abutment 13c angularly. A sufficient drive is positively applied to the abutment 13c since the inertial energy of the flywheel is increased. When the abutment 13c is driven in this manner, the release lever 13 moves angularly clockwise about the pin 14 as shown in FIG. 14, whereby the constraining member 16 rotates clockwise about the pin 18 to disengage the hook 16a from the hook 23a. Thereupon, the operating member 23 is automatically returned to its inoperative position under the resilience of the spring 27. Consequently, the head is returned to its inoperative position away from the tape, and the main switch is opened, deenergizing the electrical circuit to stop the motor. In this manner, the tape recorder is automatically stopped.

What is claimed is:

1. Apparatus for automatically stopping a tape recorder, comprising feed means for feeding recording tape in response to the rotation of said feed means, motive means for rotating said feed means at a speed which is dependent upon the speed of said motive means, stop means employing the inertial energy of said feed means when said feed means is rotating for automatically deenergizing said motive means and thus stopping the rotation of said feed means when the end of a fed tape is reached, accelerator means for increasing the speed of said motive means so as to increase the speed and therefore the inertial energy of said feed means, whereby the operation of said stop means is enhanced, and actuator means for automatically actuating said accelerator means as the end of a fed tape is reached.

2. Apparatus according to claim 1, wherein said feed means includes a rotatable flywheel and a capstan mounted coaxially with respect to said flywheel for rotation therewith.

3. Apparatus according to claim 2, wherein said motive means includes an electric motor having an output shaft.

4. Apparatus according to claim 3, further comprising drive means for coupling said output shaft of said electric motor to said flywheel.

5. Apparatus according to claim 4, wherein said drive means includes a pulley fixedly mounted to said output shaft of said electric motor for rotation therewith and an endless belt trained about said pulley and said flywheel.

6. Apparatus according to claim 4, wherein said stop means includes a pusher pin fixedly mounted on said flywheel for movement therewith, a rotatable tape supply shaft movable from a first position to a second position when the end of a fed tape is reached, a first lever pivotable from a third position to a fourth position in response to the movement of said tape supply shaft from said first position to said second position, first biasing means for biasing said first lever into said first position, a second lever pivotally mounted on said first lever for pivotal movement in response to the movement of said pusher pin when said first lever pivots from said third position to said fourth position, control means for controlling the operation of said electric motor, said control means including a reciprocating member movable between a fifth position in which said electric motor is operative and a sixth position in which said electric motor is inoperative, a third lever pivotable from a seventh position to an eighth position in response to th pivotable movement of said second lever, detent means on said third lever for maintaining said reciprocating member in said fifth position until said third lever pivots a predetermined distance from said seventh position towards said eighth position, and second biasing means for biasing said third lever into said seventh position.

7. Apparatus according to claim 6, wherein said control means further comprises a source of direct current and a control circuit connected in series with said electric motor across said source of direct current.

8. Apparatus according to claim 6, wherein said accelerator means includes a switch connected in shunt with said control circuit, said switch being movable from a ninth position in which said switch is open to a tenth position in which said switch is closed, whereby said switch short-circuits said control circuit to directly connect said motor across said source of direct current.

9. Apparatus according to claim 8, wherein said actuator means is said first lever, said switch being moved from said ninth position to said tenth position in response to the pivoting of said first lever from said third position to said fourth position.

10. Apparatus according to claim 9, further comprising third biasing means for automatically returning said reciprocating member to said fourth position.

11. Apparatus according to claim 9, wherein said tape supply shaft is rotatably mounted on said first lever.

* * * * *